March 19, 1968  J. B. WATTS  3,373,452
MANIFOLD ASSEMBLY FOR HOT AND COLD WATER FAUCET
PAIRS ARRANGED BACK TO BACK
Filed Aug. 7, 1964

James B. Watts
INVENTOR.

BY *Eugene O. Farley*

*Atty.*

United States Patent Office 3,373,452
Patented Mar. 19, 1968

3,373,452
MANIFOLD ASSEMBLY FOR HOT AND COLD WATER FAUCET PAIRS ARRANGED BACK TO BACK
James B. Watts, Portland, Oreg., assignor to James E. La Du, Portland, Oreg.
Filed Aug. 7, 1964, Ser. No. 388,086
1 Claim. (Cl. 4—192)

This invention pertains to plumbing fixtures. It pertains particularly to a manifold assembly for hot and cold water faucet pairs arranged back to back on opposite sides of a partition.

For economy of construction, it is common practice in the construction of multiple unit dwellings, office buildings and the like, to place lavatories, washbowls, sinks and other plumbing fixtures back to back on opposite sides of a partition. The hot and cold water lines and waste pipe then are placed within the partition and connected to the respective fixtures.

Where hot and cold water are supplied to faucets arranged in pairs, it is conventional to provide the hot water in the left hand faucet and the cold water in the right hand faucet. This complicates the installation of back to back plumbing fixtures since where the fixtures are fed from common, parallel, hot and cold water lines, it obviously is necessary to provide an interchange to preserve the left hand-right hand relationship of the hot and cold water faucets on each side of the partition. At the present time it is necessary to resort to a costly plumbing routine to connect the faucets to the hot and cold water lines, requiring about two hours of a plumber's time.

It is the general purpose of the present invention to provide a manifold assembly which may be installed as a single unit and which when connected to the hot and cold water lines of a building couples the hot and cold water faucets of back to back plumbing fixtures directly to the hot and cold water house lines.

It is another object of the present invention to provide a manifold assembly for hot and cold water faucet pairs arranged back to back on opposite sides of a partition, which assembly may be purchased inexpensively and installed rapidly at low cost.

A still further object of the present invention is the provision of a manifold assembly for back to back hot and cold water faucets which is useful with various types of plumbing fixtures such as washbowls, tubs, sinks, and showers, arranged in back to back relation to each other.

Another object of the present invention is the provision of a manifold assembly for back to back hot and cold water plumbing fixtures installed on opposite sides of a partition, the partition including a waste pipe, it being possible to install the assembly without rearrangement of the fixtures, partition, or waste pipe.

The manner in which the foregoing and other objects of this invention are accomplished will be apparent from the accompanying specification and claim considered together with the drawings, wherein:

Figure 2:
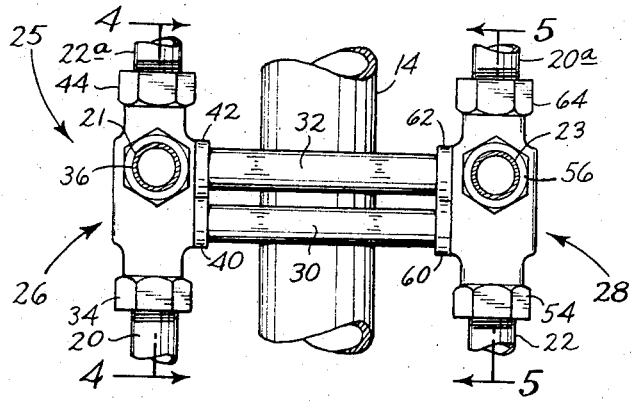
FIG. 2 is a view in front elevation of the manifold assembly.
Figure 4:
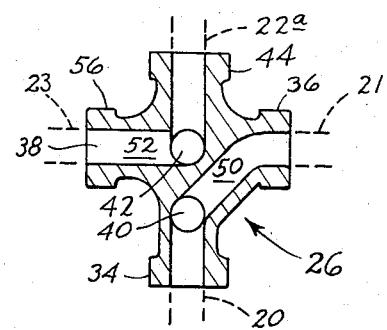
Figure 5:
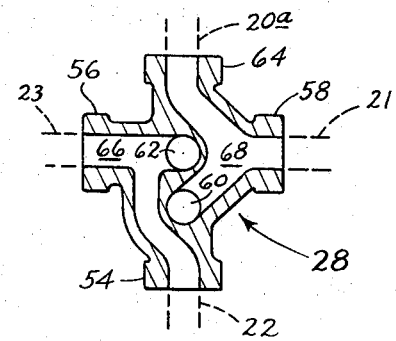

FIGS. 4 and 5 are vertical sectional views taken along lines 4—4 and 5—5 of FIG. 2 and illustrating, respectively, the construction of two manifold units which are components of the herein described manifold assembly.

Figure 1:
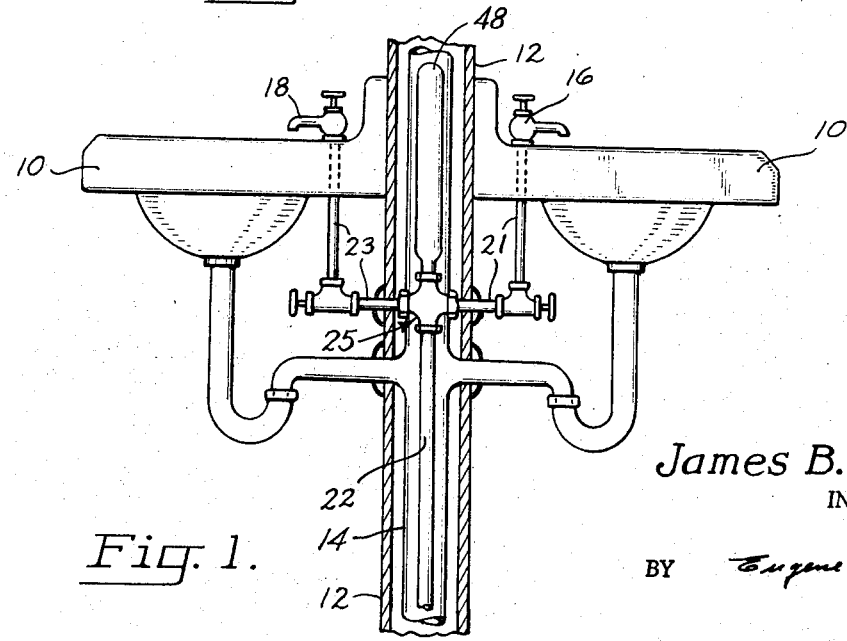
FIG. 1 is a view in side elevation, partly in section, of a pair of washbowls arranged back to back, one on each side of a partition illustrating the manner of application of the manifold assembly of my invention.

As shown in FIG. 1, the manifold assembly of my invention is designed for installation where plumbing fixtures such as washbowls 10 are to be installed back to back on opposite sides of a partition 12. The washbowls discharge in conventional manner into a vent and waste pipe 14 installed inside the partition between the washbowls.

Each washbowl is provided with hot and cold water faucets 16, 18 respectively. These are connected, respectively, to hot water lines 20, 21 and cold water lines 22, 23 installed one on each side of waste pipe 14. The lines are arranged to locate the hot water faucets on the left and the cold water faucets on the right, as viewed facing the washbowls.

The manifold assembly by means of which the hot water from main line 20 is supplied to both of hot water faucets 16 and the cold water from main line 22 is supplied to both of faucets 18 is indicated generally at 25. It consists basically of a first ported manifold 26 connected to hot water line 20, and a second ported manifold 28 connected to cold water line 22.

Figure 3:
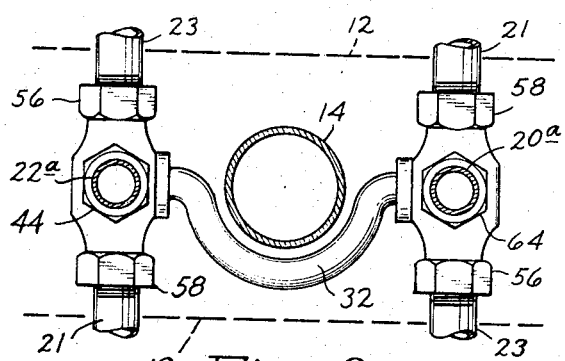
FIG. 3 is a plan view of the manifold assembly.

The two manifolds are interconnected by two lengths of tubing, the first 30, being for hot water, and the second 32, being for cold water. The tubing lengths may be bent arcuately to conform to the cross sectional dimension of waste pipe 14 which they by-pass, as shown in FIG. 3.

Manifold 26 is provided with a bottom, or hot water line, port 34 to which hot water line 20 is connected. It also is provided with a front, or hot water faucet, port 36 to which one of hot water faucets 16 is connected; a first side, or hot water connecting, port 40 to which hot water connecting conduit 30 is connected; and a second side, or cold water connecting, port 42 to which cold water connecting conduit 32 is connected. In addition, there may be a top or cold water transmission line port 44 to which a cold water transmission line 22a may be attached, leading to a plumbing unit in the next upper story. If desired, however, this may be replaced by an air cylinder 48, FIG. 1, to correct for water hammer in the usual manner.

The various ports in manifold 26 are interconnected by passageways achieving the purpose of the invention in the manner illustrated in FIG. 4.

A first passageway 50 interconnects hot water line port 34, hot water faucet port 36, and hot water connecting conduit port 40. A second conduit 52 connects cold water connecting conduit port 42 and cold water faucet port 38. In addition, if cold water transmission line port 44 is supplied, an upwardly extending extension of passageway 52 may communicate with it for passing cold water to the unit above.

The companion manifold unit 28 is provided with a bottom, or cold water line, port 54, FIG. 5, a front, or cold water faucet, port 56 to which one of cold water faucets 18 is connected: a back, or hot water faucet, port 58 to which one of hot water faucets 16 is connected, a first side, or hot water connecting conduit, port 60 to which one end of hot water connecting conduit 30 is connected and a second side, or cold water connecting conduit, port 62 to which one end of cold water connecting conduit 32 is connected.

If desired, a top, or hot water transmission line, port 64 also may be included for transmitting hot water to a companion manifold assembly in the floor above, or in the alternative to an air cylinder such as air cylinder 48 of FIG. 1.

The arrangement of passageways within manifold unit 28 is shown in detail in FIG. 5.

A first passageway 66 interconnects cold water line port 54, cold water facuet port 56 and cold water connecting conduit port 62.

A second passageway 68 connects hot water connecting conduit port 60, hot water faucet port 58 and, if desired, hot water transmission line port 64, or to an air cylinder such as cylinder 48.

The manner of application of the herein described manifold assembly will be apparent from the foregoing.

Hot water entering the manifold assembly from hot water line 20 passes through hot water line port 34, FIG. 4, passageway 50, hot water faucet port 36, conduit 21 and a hot water facuet 16.

In addition, it passes through hot water connecting conduit port 40, hot water connecting conduit 30, and thence into the companion manifold unit 28 via hot water connecting conduit port 60.

There it traverses passageway 68, FIG. 5, and flows out hot water faucet port 58 into connecting pipe 21 and one of hot water faucets 16. In addition, it optionally may pass through a hot water transmission line port 64, and line 20a to the unit on the floor above, or to an air cylinder 48, FIG. 1.

Cold water enters the manifold assembly from cold water line 22. It first enters manifold unit 28 via cold water supply line port 54, FIG. 5. Thereupon it traverses passageway 66 and cold water faucet port 56 which it leaves via connecting line 23 communicating with a cold water faucet 18.

In addition, cold water flowing through passageway 66 leaves manifold unit 28 via cold water connecting conduit port 62, traveling through cold water connecting conduit 32 into cold water connecting conduit port 42 of the companion manifold unit 26.

There it enters passageways 52, FIG. 4, by which it is led through cold water faucet port 38 to a cold water faucet 18. It also may be led through cold water transmission line port 44, and line 22a to a companion manifold assembly at another location.

Thus, by the installation of the simply constructed manifold assembly of my invention, it is possible to direct the flow of hot and cold water to the hot and cold water faucets of plumbing units arranged back to back, on opposite sides of a partition, without disarrangement of the plumbing lines or fixtures and without the necessity of installing relatively complicated cross connections.

It is to be understood that the form of my invention herein shown and described is to be taken as a preferred example of the same and that various changes in the shape, size and arrangement of parts may be resorted to without departing from the spirit of my invention or the scope of the subjoined claim.

Having thus described my invention, I claim:

1. A manifold assembly for hot and cold water faucet pairs arranged back to back on opposite sides of a partition, the assembly comprising
   (a) a pair of horizontally spaced manifolds, each being of one-piece construction,
   (b) each manifold having bottom, front and back ports, a hot water side port and a cold water side port,
   (c) connecting means on the bottom ports for connecting one manifold to a hot water line and the other to a cold water line,
   (d) connecting means on the front and back ports for connecting the front port of one manifold to a hot water faucet, the back port of said one manifold to a cold water faucet, the front port of the other manifold to a cold water faucet and the back port of said other manifold to a hot water faucet,
   (e) a hot water connecting conduit interconnecting the hot water side ports of the respective manifolds,
   (f) a cold water connecting conduit interconnecting the cold water side ports of the respective manifolds,
   (g) a first passageway in said one manifold interconnecting the hot water line port, the hot water faucet port, and the hot water side port thereof,
   (h) a second passageway in said one manifold interconnecting the cold water faucet port and cold water side port thereof,
   (i) a first passageway in said other manifold connecting the cold water line port, cold water faucet port, and cold water side port thereof,
   (j) a second passageway in said other manifold connecting the hot water faucet port and hot water side port thereof,
   (k) a cold water transmission line port in said one manifold communicating with said second passageway therein, and
   (l) a hot water transmission line port in said other manifold communicating with said second passageway therein,
   (m) the transmission line ports being adapted for connection to further manifold assemblies in remote locations.

References Cited
UNITED STATES PATENTS

| | | | |
|---|---|---|---|
| 3,307,205 | 3/1967 | Moeschler | 4—192 |
| 1,762,619 | 6/1930 | Fleming | 4—193 X |
| 2,439,712 | 4/1948 | Brady | 285—150 |

HAROLD J. GROSS, *Primary Examiner.*